United States Patent
Migdal et al.

(10) Patent No.: US 9,564,031 B2
(45) Date of Patent: Feb. 7, 2017

(54) VERIFICATION OF FRAUDULENT ACTIVITIES AT A SELF-CHECKOUT TERMINAL

(71) Applicants: Joshua Migdal, Wayland, MA (US); Matthew Farrow, Canton, MA (US); Malay Kundu, Lexington, MA (US)

(72) Inventors: Joshua Migdal, Wayland, MA (US); Matthew Farrow, Canton, MA (US); Malay Kundu, Lexington, MA (US)

( * ) Notice: Subject to any disclaimer, the term of this patent is extended or adjusted under 35 U.S.C. 154(b) by 453 days.

(21) Appl. No.: 14/139,731

(22) Filed: Dec. 23, 2013

(65) Prior Publication Data

US 2014/0176719 A1    Jun. 26, 2014

Related U.S. Application Data

(60) Provisional application No. 61/740,858, filed on Dec. 21, 2012.

(51) Int. Cl.
| | | |
|---|---|---|
| *G06K 15/00* | (2006.01) | |
| *G08B 13/196* | (2006.01) | |
| *G07G 1/00* | (2006.01) | |
| *G07G 3/00* | (2006.01) | |

(52) U.S. Cl.
CPC ........ *G08B 13/196* (2013.01); *G07G 1/0054* (2013.01); *G07G 1/0072* (2013.01); *G07G 3/003* (2013.01)

(58) Field of Classification Search
USPC ............ 235/383, 385; 705/64; 186/61
See application file for complete search history.

(56) References Cited

U.S. PATENT DOCUMENTS

| | | | |
|---|---|---|---|
| 5,747,784 A | 5/1998 | Walter et al. | |
| 5,965,861 A | 10/1999 | Addy et al. | |
| 6,056,087 A * | 5/2000 | Addy ............... | G07G 1/0045 16/66 |
| 6,296,185 B1 * | 10/2001 | Dejaeger ............ | A47F 9/046 235/383 |
| 7,631,808 B2 | 12/2009 | Kundu et al. | |
| 7,909,248 B1 * | 3/2011 | Goncalves ......... | G07G 1/0063 235/375 |
| 8,448,858 B1 * | 5/2013 | Kundu .............. | G07F 17/3241 235/375 |
| 2003/0078849 A1 * | 4/2003 | Snyder ............... | A47F 9/047 705/23 |
| 2012/0320214 A1 | 12/2012 | Kundu et al. | |

FOREIGN PATENT DOCUMENTS

| | | |
|---|---|---|
| NL | 1004940 C2 | 7/1998 |
| WO | WO2005038733 A1 | 4/2005 |

\* cited by examiner

*Primary Examiner* — Ahshik Kim
(74) *Attorney, Agent, or Firm* — Eugene H. Nahm (57) ABSTRACT

A verification method of a fraudulent activity taking place at a self-checkout terminal is disclosed. The method verifies the fraudulent activity by confirming an incident of the fraudulent activity with multiple data generated by monitoring the transaction area and the bagging area of the self-checkout terminal. A human validation is optionally performed to verify machine-identified incidents.

20 Claims, 5 Drawing Sheets

VERIFICATION OF FRAUDULENT ACTIVITIES AT A SELF-CHECKOUT TERMINAL

CROSS REFERENCE TO RELATED APPLICATIONS

This application is a non-provisional application which claims the benefit to U.S. Provisional Application No. 61/740,858 filed on 21 of Dec. 2012. This application incorporates by reference an issued U.S. Pat. No. 7,631,808 issued on 15 of Dec. 2009.

BACKGROUND OF THE INVENTION

Field of the Invention

The present invention relates generally to a security system and method to prevent fraudulent activities occurring at a self-checkout terminal. More particularly, a method and system for verifying a fraudulent activity at a self-checkout unit.

Description of Related Art

Self-checkouts are quickly becoming the established method of paying for retail goods by consumers. Their promise of shorter lines, quicker sales, and increased privacy are appealing to consumers. Furthermore, not having to staff manned-checkouts and the monetary savings associated with decreased payroll expenses is appealing to the retailer.

On the other hand, the self-checkouts present a number of problems. The opportunity, ease, and potential of deniability allow some customers to steal items by simply not scanning them or by feigning trouble scanning items. Therefore, thefts or fraudulent activities occurring at the self-checkouts can often be several times that of manned checkouts.

Accordingly, self-checkouts often employ various anti-theft measures utilizing a weight sensor or scale that measures the weight of the output at bagging area. If the increase of the weight at the bagging area is not commensurate with the item's known weight, the system raises a flag, and the transaction is halted. The self-checkouts are often erroneous and set off too many "false-positives." In addition, theft deterrence of self-checkouts is not comprehensive enough which allows additional ways that customers can steal from self-checkouts.

Therefore, what is needed is a system and verification process that can reduce theft activities and false-positive alerts of a fraudulent activities that may occur at self-checkouts.

SUMMARY OF THE INVENTION

The subject matter of this application may involve, in some cases, interrelated products, alternative solutions to a particular problem, and/or a plurality of different uses of a single system or article.

In one aspect, a method of verifying a possible activity of interest at a self-checkout terminal is provided. The method is operated via a computer processing unit. A video feed generated from a video source monitoring an item during at least a portion of a transaction time at a transaction area is obtained. The computer processing unit obtains a data feed from a data source where the data feed is generated by monitoring the item during at least a portion of the transaction time at the transaction area. The video feed and the data feed then are analyzed to identify the possible activity of interest. Then, an alert is issued when both the analyzed video feed and the analyzed data feed confirm the possible activity of interest.

In another aspect, a method of verifying a possible fraudulent activity at a self-checkout terminal is provided. A computer processing unit receives an unexpected weight data of an item from the self-checkout terminal where, the weight sensor is coupled with the self-checkout terminal to obtain the unexpected weight data of the item being placed on a bagging area. Next, the possible fraudulent activity is identified based on the unexpected weight data. The unexpected weight data is obtained to identify whether the item from the weight sensor correspond with an expected weight tolerance. The computer processing unit further identifies the possible fraudulent activity based on a data feed, where the data feed is generated from a data source monitoring the item at a transaction area.

In yet another aspect, a system for verifying a possible fraudulent activity at a self-checkout terminal is provided. The system comprise a computer processing unit operable to analyze a plurality of data feed generated during at least a portion of a transaction time. The plurality of data feed is generated by monitoring an item being transacted at the self-checkout terminal and the computer processing unit is capable of correlating each of the plurality of data feeds with a preset data associating the item to identify the possible fraudulent activity. Further, the computer processing unit is configured to issue an alert when at least two of the plurality of data feeds confirms the identified possible fraudulent activity. The plurality of data feeds comprises a video feed, a transaction data, and an unexpected weight data. The system further comprises a video source, which generates the video feed, communicatively coupled with the computer processing unit. A weight sensor is coupled with the self-checkout terminal which transmits the unexpected weight data to the computer processing unit. The self-checkout terminal is communicatively coupled to the computer processing unit.

In a further aspect, a method of identifying a loss incident at a self-checkout terminal is provided. A computer processing unit obtains a video feed, wherein the video feed is generated from a video source monitoring an item at a transaction area. The video feed is generated during at least a portion of a transaction time. The computer processing unit identifies the loss incident based on the obtained video feed by a video analysis, and then modifies the video feed to simplify it. The modified video feed is transmitted to a human validation terminal to perform a human validation. The human validation response is then received to identify the loss incident based on the human validation. An alert is issued based on the video analysis and the human validation response.

DETAILED DESCRIPTION

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

The issued U.S. Pat. No. 7,631,808 describes in detail the process of video analysis and transaction data analysis. As such, the issued U.S. Pat. No. 7,631,808 is incorporated herein by reference. The examiners are invited to furnish the electronic copy of the aforementioned issued patent.

In its essence, U.S. Pat. No. 7,631,808 describes methods and apparatus for detecting a transaction outcome such as suspicious activity related to a transaction (e.g., purchase, refund, void, etc.) of items by a customer at a transaction terminal. The system obtains video data associated with a transaction area. The video data may be obtained, for example, from an elevated camera focused on a cash register check out or other transaction area in a supermarket or other retail establishment. The system applies an automated machine video analysis algorithm that is disclosed as part of the system to analyze at least a portion of the video data to obtain at least one video parameter concerning at least a portion of a transaction associated with the transaction area. As an example, the system can analyze the video data to track (e.g. identify the presence of) items involved in the transaction in the transaction area. This process can automatically identify the presence of an item involved in the transaction from the video data analysis. This can be done, for example, by automatically detecting item activity in the transaction area and/or detecting operator activity in the transaction area. Detection of item presence can include detecting removal of an item from a region of interest in the transaction area and/or detecting introduction of an item into a region of interest in the transaction area.

Using the combination of video analysis in comparison with transaction data, the system can determine if the presence of the item identified in the analysis of the video data has a corresponding presence in the transaction data, and if not, identifies the suspicious activity. As an example, for each detector, the system can compare the set of detection events for that detector to at least a portion of the transaction data to identify at least one apparent discrepancy in a number of items detected by that detector from a number of items indicated in the portion of transaction data. Transaction data such as transaction count (e.g. scan count) or transaction item identity thus represents the presence of an item or a number of items scanned (for an entire transaction), while the detection event data or video count from the video analysis represents the presence (or number) of items that the operator causes to move through the transaction area. Many other embodiments are disclosed herein, details of which are provided in the detailed description section.

Generally, the present invention concerns a method of verifying a possible fraudulent activity which may occur during a self-checkout transaction by a customer. The present invention enhances the operation of a self-checkout operation by integrating the self-checkout operation with additional verification measures to confirm the possible fraudulent activity identified by a self-checkout terminal. The enhancement is facilitated by combining one or more of the following data feeds: a video analysis, transaction data integration, weight integration, and an optional human validation process. The combination ensures a possible fraudulent activity initially identified by the self-checkout terminal and verifies the legitimacy of the possible fraudulent activity. In turn, the present invention reduces false-positive alert given to the possible fraudulent activity where the alert is only issued based on a single verification.

Examples of possible fraudulent activities may include, but are not limited to, when a customer at the self-checkout terminal places an item that is not being transacted in a bagging area; places another item in place of the item being purchased in a bagging area; places an item outside of the bagging area, such as on the floor, input area, or other areas not specifically designated for collection of purchased item, without transacting it through the self-checkout terminal; and takes unpurchased items following the end of the transaction; and the like.

Examples of false-positive fraudulent activities may include, but are not limited to, when non-merchandise items are placed in a bagging area such as purses, cell phone, umbrella, outerwear, etc.; free merchandise items, such as promotional item placed in a bagging area; merchandise items not associated with the current transaction, such as items purchased previously from the same store or from another store placed in a bagging area; triggering of weight discrepancies caused by partially consumed items, merchandise items whose weight changes with age, or other types of correctly scanned; leaning or sitting on the bagging/output area scale causing unexpected weight increase; use of reusable bags; items falling off of the output area, and the like.

Video source contemplated herein may include, but are not limited to, a video camera such as, analog cameras and IP cameras, and the like; a device that can provide a video feed of any duration, such as a DVR; a portable computing device having a camera, such as a tablet computer, laptop computer; and the like.

Data feed contemplated herein may be in the format including, but are not limiting to, XML, JSON, CSV, binary, over any connection type: serial, Ethernet, etc. over any protocol: UDP, TCP, and the like.

In one embodiment, a possible activity of interest at a self-checkout terminal may be verified. The method and system disclosed herein may not be limited to identifying and verifying a possible fraudulent activity. The possible activities of interest may be activities at the self-checkout terminal that are not fraudulent activities. The possible activity of interest may include, but are not limited to, a delay between a plurality of items being passed through the self-checkout terminal, a mechanical error occurring to the self-checkout terminal, a paper jam of a receipt printing at the self-checkout terminal, a customer distress call, and the like, The examples of the possible activity of interest that are not the possible fraudulent activity may or may not require an intervention or an alert, thus, may implement a verification process without issuing the intervention or the alert.

A system for implementing the disclosed method of verifying a possible fraudulent activity at a self-checkout terminal is provided. The system may comprise a computer processing unit, such as a Digital Video Analyzer (DVA), a video source, a weight sensor, and the self-checkout terminal.

The computer processing unit may be operable to analyze a data feed generated by monitoring an item being scanned at the self-checkout terminal. The data feed may comprise a video feed, a transaction data, and an unexpected weight data. The data feed may be obtained by the computer processing unit to identify the possible fraudulent activity. The identified possible fraudulent activity may be further verified based on an analysis conducted over another type of the data feed. The video feed may be obtained from the video source monitoring an item placed at a transaction area. The unexpected weight data may be a result of analyzing a weight measure from the weight sensor. The weight sensor measures the weight of the item being placed at a bagging area. The unexpected weight data may be obtained when the weight of the item does not correspond with an expected weight tolerance.

In one embodiment, the expected weight tolerance may be a range of acceptable weight assigned to the item. For example, an apple may be assigned the expected weight tolerance based on an average weight of an apple.

In another embodiment, the unexpected weight data may indicate that the weight of the item is outside the range of acceptable weight specified by the expected weight tolerance. If the weight of the item is outside the expected weight tolerance, the unexpected weight data may identify the possible fraudulent activity.

In yet another embodiment, the unexpected weight data may indicate that the weight of the item is inside the expected weight tolerance, thus denying the possible fraudulent activity.

In yet another embodiment, the item may not be assigned with the expected weight tolerance. In this embodiment, the unexpected weight data may identify the possible fraudulent activity by indicating that the item does not have an existing weight tolerance, therefore the weight of the item does not correspond with the expected weight tolerance.

In a further embodiment, the unexpected weight data may indicate a difference between the weight of the item measured from the weight sensor and the expected weight tolerance. For example, if the weight of the item is heavier and outside the expected weight tolerance, the unexpected weight data may indicate such difference. The expected weight tolerance also may be a single number, and the unexpected weight data may indicate the difference in a similar manner.

The system for implementing the disclosed method of verifying a possible fraudulent activity at a self-checkout terminal may further comprise a human validation terminal to perform a human validation. The human validation terminal may analyze a portion of the video feed to verify or identify the possible fraudulent activity.

In one embodiment, the computer processing unit may be operable to modify the video feed where the video feed may be simplified. The modification of the video simplifies the video feed such that the human validation terminal operated by a video analyst can process the modified video feed in real-time via the human validation. A detailed process of the human validation is disclosed further in the disclosure.

Simplifying the video feed can be as simple as clipping it into a short-duration snippet, in order to review only a portion of the video feed. It can also involve image processing in order to facilitate the human validation. It can also involve taking snapshots from the video feed. It can also include rotating, scaling, and performing other affine transforms to the video feed in order to regularize the look of the video for consistency of review purposes. All of these are to be understood as simplifications of the video feed.

A plurality data feed may be generated per an item being transacted at the self-checkout terminal. The possible fraudulent activity may first be triggered by one of the plurality of data feeds, then verified. Typically, the self-checkout terminal has a built-in mechanism which may initially flag the possible fraudulent activity. In order to ensure that the initially flagged possible fraudulent activity does need an alert or an intervention, more than one of the plurality of data feeds may be utilized to verify the possible fraudulent activity, confirming or denying the possible fraudulent activity. Each of the plurality of data feeds may be transmitted to a computer processing unit electronically communicating with the self-checkout terminal. Each of the plurality of data feeds may be analyzed in comparison to a preset data.

The preset data refers to an expected data feed assigned to each items being sold at a store. Examples of the preset data may include, but are not limited to, the expected weight tolerance, an expected shape of the item, an expected number of counts of the item, and the like.

In one embodiment, the possible fraudulent activity may be verified utilizing a weight sensor. The weight sensor may be electronically coupled to a bagging area of the self-checkout terminal, providing a weight of an item placed in the bagging area. The provided weight of the item may be compared to the expected weight tolerance of the item.

The expected weight tolerance may be assigned to each items being sold at the store, setting a tolerance level that may be accepted. When the weight of the item exceeds or falls behind the expected weight tolerance of the item, the item may be flagged as the possible fraudulent activity. An item may be assigned more than one of the expected weight tolerance. For example, the item may come with a bonus item during a buy one get one free event.

The expected weight tolerance may be utilized to capture an item being placed in the bagging area where the item is not an item categorized in the store. In such case, the expected weight tolerance may be set to zero as a default to flag the item having a weight that is not an item categorized in the store.

The unexpected weight data may be generated accordingly as disclosed herein. The possible fraudulent activity may be identified based on the unexpected weight data where the unexpected weight data is obtained when a weight of an item from the weight sensor does not correspond with the expected weight tolerance.

In another embodiment, a video analysis may be utilized to verify the possible fraudulent activity. A video feed may be generated by a video source monitoring activities at a transaction area. The transaction area is not limited to a certain section of the self-checkout terminal, but may include surrounding areas of the self-checkout terminal. The video analysis may be conducted via the computer processing unit where the video feed is analyzed frame by frame to identify the possible fraudulent activity. The frame-by-frame analysis may identify an item that is not being sold at the store, in which case such activity may not be the possible fraudulent activity. The video feed of the item before and after being placed at the bagging area may be analyzed to verify the possible fraudulent activity. Various video analysis techniques are available and the method and process of the video analysis pertaining to the present invention is being incorporated herein by reference.

In yet another embodiment, a transaction data may be correlated to the video analysis in order to verify the possible fraudulent activity. Such method and process is also being furnished herein by aforementioned incorporation by reference.

A possible fraudulent activity occurring at a self-checkout terminal may be verified to determine if an intervention is necessary. The intervention may be in the form of an alert given to the self-checkout terminal electronically, such as halting the self-checkout terminal.

The alert may be given to a self-checkout attendant where the self-checkout attendant may proceed with the intervention.

In one embodiment, the alert may be issued if the possible fraudulent activity is confirmed based on two of the plurality of data feed.

In another embodiment, the alert may be denied if the possible fraudulent activity identified by one of the plurality of data feed indicated a false-positive case.

In yet another embodiment, the alert may be issued even if each of the plurality of data feed indicates a different results. In this embodiment, the human validation may be conducted to further verify the possible fraudulent activity. By of example, a bunch of bananas may be verified as a single banana based on the video feed, but the bunch of bananas may be outside the expected weight tolerance depending on the number of bananas in the bunch. In such a case, the human validation may further verify the possible fraudulent activity before issuing the alert.

The possible fraudulent activity may be verified further by a human validation. The human validation may utilize the video feed produced by the video source. The video feed may be modified where the video feed is simplified, then the modified video feed may be sent to a human validation terminal from the computer processing unit, followed by verifying whether the modified video confirm the possible fraudulent activity. The human validation may be found useful in cases where the possible fraudulent activity is difficult and/or confusing to be verified by other machine-enabled means of verification. The human validation terminal may be operated by a video analyst.

In one embodiment, the human validation may be conducted as a final step to confirm the possible fraudulent activity being verified by the plurality of data feed.

The modification of the video feed disclosed herein may include image analysis and processing approaches that can be used to facilitate the human validation. By way of non-limiting examples, such modification may include, but are not limited to, highlighting differences between one or more images to show regions of discrepancy; cropping or masking the imagery to eliminate distracting details and to focus attention on the pertinent areas of the scene; rotating and subjecting the imagery to transformations (both affine and non-linear, e.g., rotating, stretching, shearing, mirroring, eliminating distortion, etc.) to put the imagery into a consistent canonical view; highlighting regions in the image where items are introduced, removed, manipulated, or moved; highlighting optical flow; highlighting motion trails; highlighting of previously validated items of merchandise; overlay transaction log and self-checkout event information (e.g., weight sensor information, scanner information, skip-bagging button, customer presence detection information, electronic article security tag deactivation, tag removal, etc.); highlighting specific image regions designated for specific activity (e.g., input area, output area, etc.); etc.

The verification of the possible fraudulent activity may be conducted with the human validation in real-time.

The human validation may be considered to make up for deficiencies in non-human enabled verification method of the possible fraudulent activity. For example, tuning automated parameters in an automated verification system will give the system a specific false positive rate and true positive rate. For example, if such a system is tuned to yield a true positive rate of 50%, the false positive rate may be too high. In this case, combining the automated approach with specific human validation may yield a composite system capable of maintaining the desired true positive yield while reducing the false positive rate to something more manageable.

In one embodiment, the human validation may be processed utilizing a web service. The modified video feed may be communicated via a web browser utilizing the web service having access to an internet connection. The analyst conducting the human validation may utilize a web application to review and verify the alert being sent from the computer processing unit. The web application may call into the web service via long polling mechanisms in order to create an event driven interface for verification/validation. If no validation jobs are in the web service, the long polling mechanism eventually may time out and be immediately reestablished by the web application. If a job is available, the long polling call returns with the job's details. Subsequent web calls may be made from the web application to the web service in support of the job. In the meantime, when the DVA has job requiring human validation, it will call into the web service with job details. This call may not immediately return.

In one embodiment, the job may go to the web service job queue, which will give the job to a waiting web application client. Once the job is completed, the human validation result is then passed on to the waiting computer processing unit/DVA call.

A loss incident may be verified by the video analysis. The loss incidents contemplated herein may include, but are not limited to, when a customer neglects an item in a cart, a theft activity, and the like. The loss incident may occur when the item is not being placed at the bagging area, disabling the weight sensor from performing its function. The lost incident may undergo the human validation to verify whether the loss incident truly occurred or not.

In one embodiment, the loss incident at a self-checkout terminal may be verified by obtaining a video feed generated from the video source monitoring an item at a transaction area. The video feed may be a partial video feed of the item during a transaction time. The transaction time indicates a period of time from the item being introduced to the self-checkout terminal to a payment being successfully transacted. The video analysis of the video feed conducted by the computer processing unit may be verified by the human validation performed at the human validation terminal. If the loss incident is confirmed, an alert or an intervention may be issued.

Figure 1:
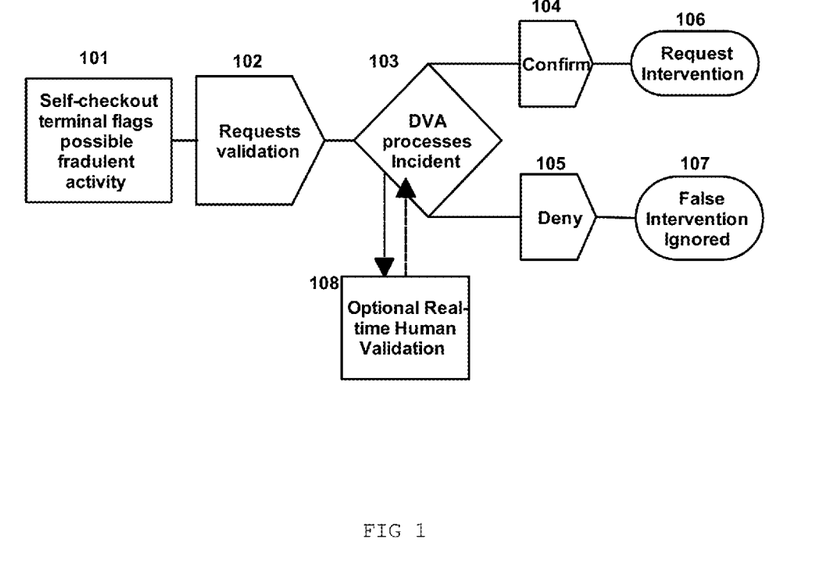
FIG. 1 provides an embodiment of a method of verifying a possible fraudulent activity at a self-checkout terminal.

Turning now to FIG. 1, an embodiment of a method of verifying a possible fraudulent activity at a self-checkout terminal is described. First, the self-checkout terminal flags a possible intervention 101; an intervention or an alert may be needed if an incident at the self-checkout terminal is a fraudulent activity. The self-checkout terminal may initially obtain a data feed generated from the self-checkout terminal by monitoring an item being transacted, and identify the possible fraudulent activity. The self-checkout terminal requests a validation 102 of the identified possible fraudulent activity. A central processing unit may utilize a plurality of data feed to process 103 the incident and determined whether an intervention is needed. The plurality of data may be analyzed to verify whether the possible fraudulent activity is confirmed or denied. The human validation may be applied optionally in order to confirm or deny the possible fraudulent activity 108.

If the analysis of one or more of the plurality of data confirms 104 that the possible fraudulent activity is indeed fraudulent, the self-checkout terminal may request the intervention 106 where the intervention may be given in the form of an alert appearing on the self-checkout unit or an alert being sent to a self-checkout attendant notifying to intervene the transaction being processed at the self-checkout terminal.

If the analysis of one or more of the plurality of data denies 105 the possible fraudulent activity, the incident may be ignored and no intervention would take place 107.

Figure 2:
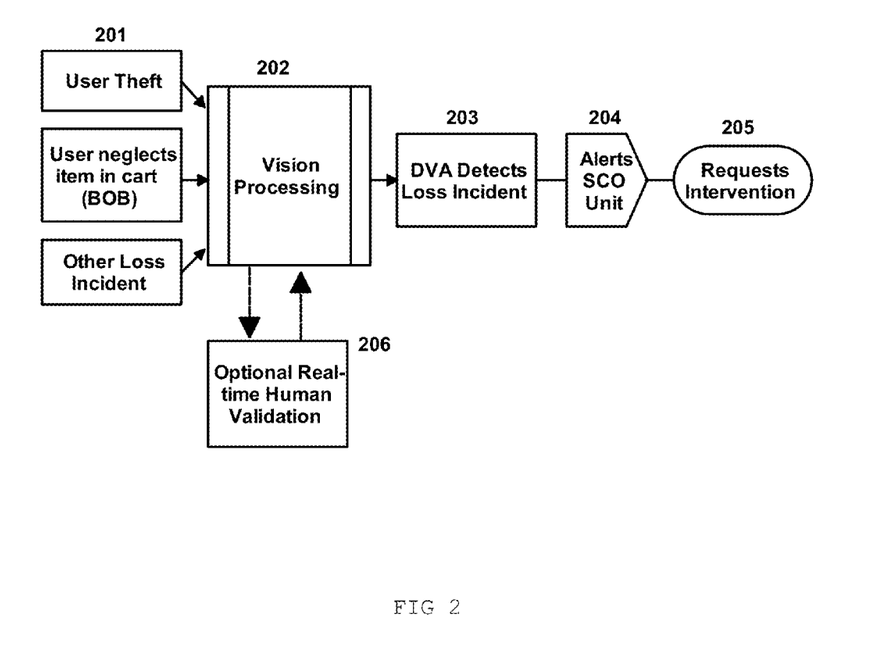
FIG. 2 provides an embodiment of the method of identifying a loss incident at the self-checkout terminal.

FIG. 2 shows an embodiment of the method of identifying a loss incident at the self-checkout terminal. When the loss incident 201 occurs at the self-checkout terminal, the visual analysis 202 is conducted by the central processing unit to verify whether the loss incident is confirmed or false. The central processing units identifies the loss incident 203 from the visual analysis and alerts the self-checkout unit 204, thereby the intervention is requested. The human validation 206 may be applied optionally in order to confirm or deny the visual analysis being conducted for the loss incident. An alert is given to the self-checkout unit once the loss incident is confirmed which may be followed by requesting an intervention 205.

Figure 3:
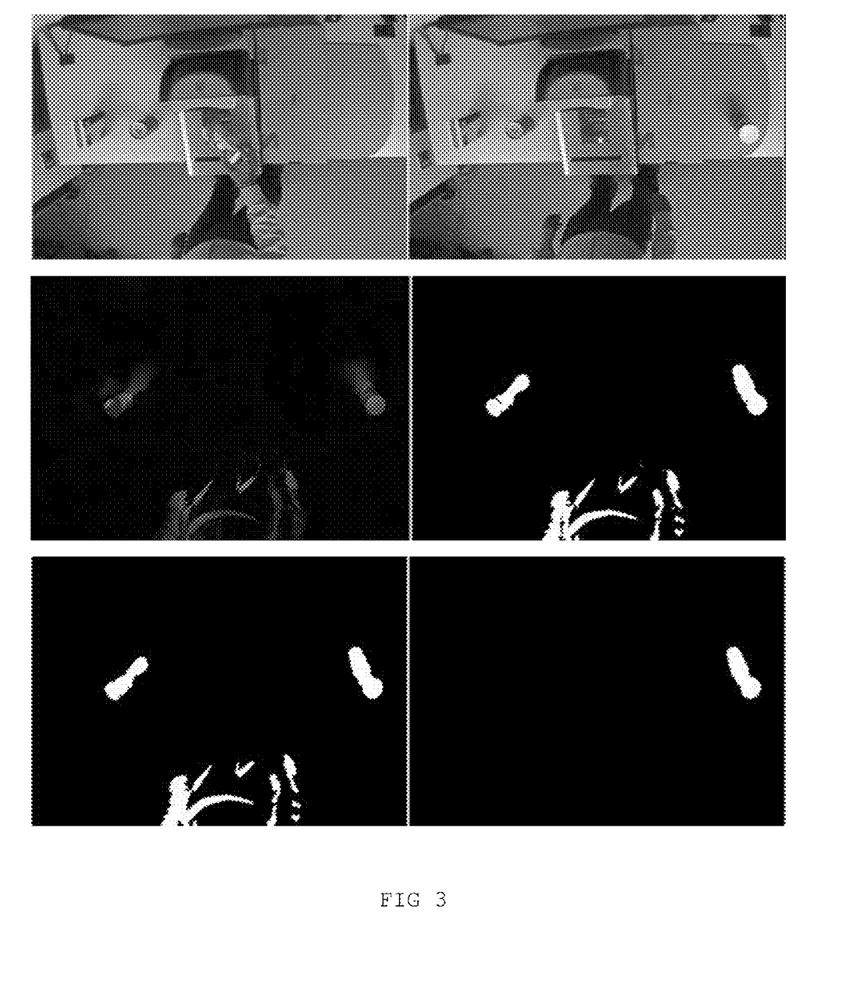
FIG. 3 provides an embodiment of a video feed modification which is being sent for a human validation.

FIG. 3 shows an embodiment of a video feed modification which is being sent for the human validation conducted by a video analyst. FIG. 3 shows a modified video feed of an item being scanned. First it shows a snapshot being taken at scanning time, followed by a snapshot taken at bagging time. Highlights are applied to modify the video feed by differencing the snapshot where the highlights indicate pertinent changes in the bagging area. Silhouettes of the highlighted video feed than is obtained via thresholding, followed by morphological operations, and blob based connected component analysis to simplify the video feed to show a single item being added to the bagging area.

Figure 4:
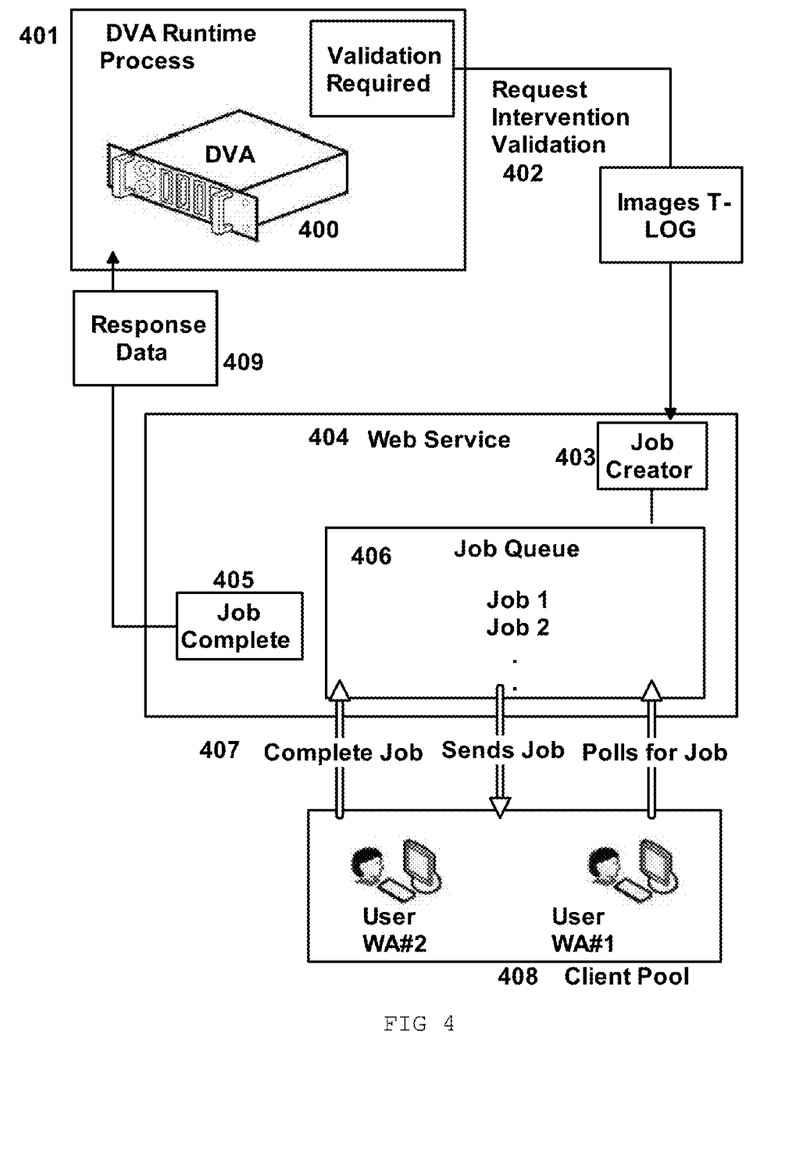
FIG. 4 provides an embodiment of a human validation process.

FIG. 4 provides an embodiment of a human validation. The human validation may be conducted first by receiving a human validation request 402. Before sending out the alert of the intervention, the human validation may be initiated 401 by the DVA 400 or the central processing unit. A video feed form the video source may be modified and sent to the web service 404. The modified video feed (images T-LOG) is then queued at the job queue 406 by the job creator 403. Once the human validation job is sent 407 to be processed, a video analyst uses the human validation terminal 408 or a web application (WA) to conduct the human validation of the modified video feed. Once the human validation job is completed 405 the response 409 of the human validation is sent back to the DVA.

Figure 5:
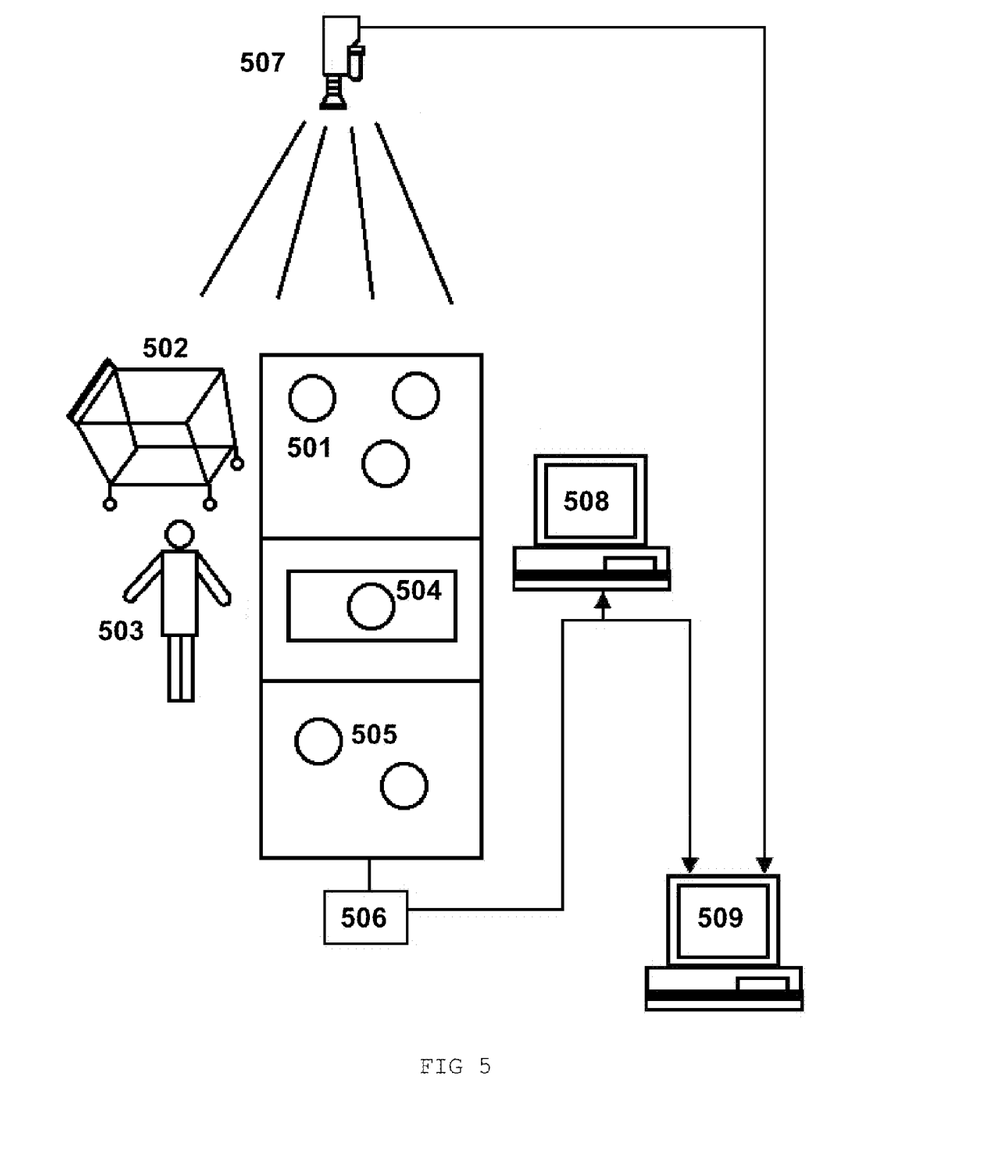
FIG. 5 provides an embodiment of a system for verifying a possible fraudulent activity at a self-checkout terminal.

FIG. 5 shows an embodiment of a system for verifying a possible fraudulent activity at a self-checkout terminal. A computer processing unit 509 communicates with a self-checkout terminal 508. The self-checkout terminal 508 is connectively coupled to a weight sensor 506 which measure a weight of a plurality of items placed in a bagging area 505. The video camera 507, electronically communicating with the computer processing unit 509, may monitor activities on a transaction area 501, 504 which may also monitor a cart 502 and a customer 503. In this embodiment, a video feed is generated by the video camera and transmitted to the central processing unit. The computer processing unit may identify the possible fraudulent activity based on the video feed. A weight sensor may also be utilized in the present system to verify the possible fraudulent activity. The unexpected weight data may identify the possible fraudulent activity based on a weight of each of the plurality of items and an expected weight tolerance corresponding to each of the plurality of items. The computer processing unit may authorize an alert/intervention to be given based on the unexpected weight data.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A method of verifying a possible activity of interest at a self-checkout terminal, the method operated via a computer processing unit, comprising the steps of:
    obtaining a video feed generated from a video source wherein the video feed is generated by monitoring an item during at least a portion of a transaction time, the item being located at a transaction area;
    analyzing the video feed to identify the possible activity of interest;
    modifying the video feed wherein the video feed is simplified;
    transmitting the modified video feed to a human validation terminal for a human validation of the identified possible activity of interest;
    receiving a human validation response resulting from the human validation; and
    verifying the identified possible activity of interest based on the human validation response.

2. The method of claim 1 wherein the step of modifying the video feed comprises at least one of:
    highlighting the video feed;
    taking a snapshot from the video feed;
    clipping the video feed into a short-duration snippet; and
    applying affine transform to the video feed.

3. The method of claim 1 further comprising the step of obtaining a data feed from a data source, the data feed being generated by monitoring the item during at least a portion of the transaction time, and analyzing the data feed to identify the possible activity of interest, wherein the data feed comprises at least one of:
    the data feed from a transaction data wherein the transaction data is generated from the self-checkout terminal as the item is scanned at the self-checkout terminal; and
    the data feed from a weight sensor wherein the weight sensor detects a weight of the item.

4. The method of claim 3 wherein the step of analyzing the data feed to identify the possible fraudulent activity by obtaining the data feed from a weight sensor comprises
    identifying the possible fraudulent activity based on the weight of the item, wherein the weight is obtained to identify whether the weight from the weight sensor corresponds with an expected weight tolerance.

5. The method of claim 1 further comprising the step of issuing an alert if the identified possible activity of interest is verified by the human validation response.

6. The method of claim 3 further comprising the step of issuing an alert if a combined analysis of the identified possible activity of interest based on the data feed, the video feed, and the human validation verifies the identified possible activity of interest.

7. A method of verifying a possible fraudulent activity at a self-checkout terminal, the method operated via a computer processing unit, comprising the steps of:
    receiving a data feed of an item from the self-checkout terminal, wherein the data feed is generated from a data source monitoring the item at a transaction area, the data feed being generated during at least a portion of a transaction time, the data source communicatively coupled with the self-checkout terminal; and identifying the possible fraudulent activity based on the data feed;

modifying a video feed wherein the video feed is simplified, the video feed being generated from a video source monitoring the item during at least a portion of the transaction time;

transmitting the modified video feed to a human validation terminal for a human validation of the identified possible fraudulent activity; and receiving a human validation response from the human validation terminal to verify the possible fraudulent activity.

8. The method of claim 7 wherein the step of receiving a human validation response from the human validation terminal to verify the possible fraudulent activity comprises correlating the identified possible fraudulent activity based on the data feed with the human validation response to verify the possible fraudulent activity.

9. The method of claim 7 wherein the step of modifying the video feed comprises at least one of:
highlighting the video feed;
taking a snapshot from the video feed;
clipping the video feed into a short-duration snippet; and
applying affine transform to the video feed.

10. The method of claim 7 wherein the step of identifying the possible fraudulent activity based on a data feed comprises at least one of:
identifying the possible fraudulent activity based on a video analysis, the video analysis being performed by the computer processing unit analyzing the video feed
identifying the possible fraudulent activity based on a transaction data wherein the transaction data is generated from the self-checkout terminal as the item is scanned at the self-checkout terminal; and
identifying the possible fraudulent activity based on a weight of the item, the weight being detected by a weight sensor in communication with the self-checkout terminal.

11. The method of claim 7 further comprising the step of:
issuing an alert if a combined analysis of both the identified possible fraudulent activity based on the data feed and the human validation confirm the identified possible fraudulent activity.

12. The method of claim 7 further comprising the step of:
denying an alert if at least one of the identified possible fraudulent activity based on the data feed and the human validation does not confirm the identified possible fraudulent activity.

13. The method of claim 10 wherein the step of identifying the possible fraudulent activity based on a weight of the item comprises identifying whether the weight from the weight sensor corresponds with an expected weight tolerance.

14. A system for verifying a possible fraudulent activity at a self-checkout terminal comprising:
a computer processing unit operable to analyze a data feed generated during at least a portion of a transaction time, the data feed being generated with a data source monitoring an item being transacted at the self-checkout terminal, the computer processing unit being in communication with the data source;
a video source communicatively coupled with the computer processing unit, the video source operable to generate a video feed of the item by monitoring the item during at least a portion of the transaction time; and
the computer processing unit being configured to:
identify the possible fraudulent activity based on the data feed;
modify the video feed wherein the video feed is simplified;
transmit the modified video feed to a human validation terminal for a human validation of the identified possible fraudulent activity; and
receive a human validation response from the human validation terminal to verify the possible fraudulent activity.

15. The system of claim 14 wherein the computer processing unit is further configured to correlate the identified possible fraudulent activity based on the data feed with the human validation response to verify the possible fraudulent activity.

16. The system of claim 14 wherein the computer processing unit is further configured to issue an alert if a combined analysis of both the identified possible fraudulent activity based on the data feed and the human validation confirm the identified possible fraudulent activity.

17. The system of claim 14 wherein the computer processing unit is further configured to deny an alert if at least one of the identified possible fraudulent activity based on the data feed and the human validation does not confirm the identified possible fraudulent activity.

18. The system of claim 14 wherein the step of modifying the video feed comprises at least one of:
highlighting the video feed;
taking a snapshot from the video feed;
clipping the video feed into a short-duration snippet; and
applying affine transform to the video feed.

19. The system of claim 14 wherein the data feed comprises at least one of:
a video analysis obtained by the computer processing unit analyzing the video feed;
a transaction data, wherein the transaction data is generated from the self-checkout terminal as the item is scanned at the self-checkout terminal, the data source being the self-checkout terminal; and
a weight of the item, the weight being detected by a weight sensor in communication with the computer processing unit, the data source being the weight sensor.

20. The system of claim 19 wherein the computer processing unit identifies the possible fraudulent activity based on the weight of the item by identifying whether the weight from the weight sensor corresponds with an expected weight tolerance.

* * * * *